Patented Jan. 2, 1951

2,536,750

UNITED STATES PATENT OFFICE 2,536,750

ORGANIC MERCURY COMPOUNDS AND GERMICIDAL COMPOSITIONS THEREOF

Jonas Kamlet, New York, N. Y., assignor to Pittsburgh Coke & Chemical Company, Pittsburgh, Pa., a corporation of Pennsylvania No Drawing. Application May 19, 1947, Serial No. 749,096

10 Claims. (Cl. 117—138.5)

This invention relates to organic mercury compounds and to compositions prepared from such compounds. More particularly, it is concerned with water-soluble organic mercury compounds of the type containing an amino aryl mercuric cation.

A principal object of the present invention is the provision of new organic mercury compounds and to compositions produced from such compounds which may be used for the destruction or inhibition of microorganisms at the same time being of relatively low toxicity to human beings or domestic animals Further objects include:

(a) The provision of organic mercury compounds which have groups within their molecular structure which may react with ligno-cellulosic materials, e. g., wood, lumber, wood pulp, paper, newsprint, cotton, plants, seeds, fruits, and any other products containing any substantial lignin-like components, and become an integral part thereof;

(b) The provision of organic mercury compounds having the mercury organically bound in the chemical molecule in such fashion so as to possess substantially no tendency to dissociate from the organic portion and lose the microorganism destructive properties of the compound;

(c) The provision of such compounds which are soluble in water to a very substantial degree, thereby permitting the sale and storage of relatively concentrated aqueous solutions of the products;

(d) The provision of new procedures for rendering ligno-cellulosic materials fungicidal and bactericidal;

(e) The provision of new procedures for the destruction of minor organisms, such as bacteria, molds, insects, weeds and the like;

(f) The provision of new germicidal compositions;

(g) The provision of organic mercury compounds containing a quaternary ammonium ion which have exceptionally high germicidal properties in relationship to the mercury content of the compounds.

Still further objects and the entire scope of applicability of the present invention will become apparent from the detailed description given hereinafter; it should be understood, however, that the detailed description and specific examples are given by way of illustration only, and while indicating preferred embodiments of the invention, are not given by way of limitation, since various changes and modifications within the spirit and scope of the invention will become apparent to those skilled in the art from this detailed description.

These objects are accomplished in accordance with the present invention by the production of organic mercury compounds having an aromatic nucleus substituted with one or two mercury containing radicals of the formula (RCHOHCOOHg—)

where R is hydrogen or an alkyl radical, and also substituted with an amino group or the salts of such compounds made by neutralizing the amino group with at least an equimolecular proportion of an alpha-hydroxy aliphatic mono-carboxylic acid; by the preparation of minor organism destructive compositions from such mercury compounds; and by the use of these compositions for the destruction of micro forms of organisms, e. g., for germicidal, herbicidal, fungicidal and insecticidal purposes.

It has been found by experimentation, that the most important group of the general class, indicated above as encompassed by this invention, are those compounds which may be represented by the formula:

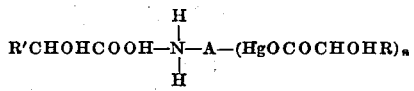

wherein $n$ is either 1 or 2, R and R' are hydrogen or alkyl radicals and A represents a substituted or unsubstituted aryl radical. The preferred compounds are those in which A represents a polyvalent aromatic radical from the group:

or

in which X represents monovalent substituents on the aromatic nucleus, being hydrogen, halogen, hydroxyl and alkyl radicals, and $m$ is the integer 1, 2 or 3. In this group, the most unique products have been found to be in which the substituents R, R' and X are either hydrogen or methyl radicals, although compounds of other aryl radicals, such as biphenyl, phenanthryl, etc., may be used.

Specific compounds within the classification indicated above include the lactic acid and hydroxy acetic acid salts of the following amino compounds: 4 - amino, 3 - methylphenylmercuric lactate; 4,6 - bis - (hydroxyacetoxymercuri-), 2-methyl aniline; 4-amino - 3,5 - dichlorophenylmercuric lactate; 4-amino, 2-hydroxyphenylmercuric lactate; 2 - amino, 3 - chloro, 4-methyl-phenylmercuric lactate; 4,6-bis-(lactoxy mercuri), 2 - methyl, 5 - chloro aniline; 2 - amino, 3-chloro, 5-ethylphenylmercuric lactate; 1-amino, 3-methyl naphthyl-2 mercuric lactate; 2-amino, 3,6-dichloro, 8-methyl naphthyl-1 mercuric lactate; 2,4-bis (lactoxy mercuri-), 3-methyl, 1-amino naphthalene; and the corresponding compounds of hydroxyacetic acid; 4-amino phenylmercuric 2-hydroxybutyrate, and similar compounds. The free, unneutralized amines from which these salts are prepared may also be used although the salts are preferred. This is because not only have the salts been discovered to be unusually soluble but they also have more germicidal power than the free amino compounds. The exact reason for this is not certain, but the experimental evidence indicates that this is due to the presence of the quaternary ammonium group in the molecule.

The preferred compounds are the lactic acid and hydroxyacetic acid salts of an aminophenylmercuric hydroxyacetate, and aminophenylmercuric lactate, an amino methylpenylmercuric hydroxyacetate or an amino methylphenylmercuric lactate.

The success of the present invention is due to a large extent to the discovery that compounds falling within the general classification indicated above, have relatively high water solubility, as compared with the related organic mercuric compounds known heretofore. This discovery makes possible the production of new germicidal and similar minor organisms destructive products which may be diluted with water or used in preponderately aqueous media without resort to extraordinary methods or expediencies in order to maintain the mercury compound in solution (for the expediencies to which the prior art has resorted see for example Patent No. 2,411,815).

Further, the present invention involves the discovery that the mercury compounds of the general classification noted are reactive with ligno-cellulose containing materials so as to become an integral part of such materials and become permanently bound thereto, i. e., these mercury compounds are ligno-cellulose substantive. As a result of this characteristic, these mercury compounds may be used to provide permanent fungicidal or meldew proof properties to fabrics, woods, paper, or similar materials. While the exact reason for the substantivity of these compounds is not certain, it appears to be due to the fact that the mercury compounds are capable of forming a Schiff base by interaction with the lignin molecule. This is in part evidenced by the fact that these compounds, in concentrated aqueous solution, will give a characteristic, yellow, Schiff base coloration with ligno-cellulosic materials, although in the great dilutions in which these amino aryl mercurials are employed in practice, they do not discolor the treated ligno materials in any way.

The new organic mercury compounds of this invention are most readily prepared by the procedure which briefly comprises the direct reaction of one mole of aromatic amine with one or two moles of a mercuric salt of an alpha-hydroxy aliphatic monocarboxylic acid. The reaction is preferably carried out in the presence of an excess of the monocarboxylic acid at temperatures in the neighborhood of 15° to 30° C. for sufficient length of time to permit the mercury salt to completely react with the amine.

The products and procedures of the present invention will be more readily comprehended by reference to the following illustrative examples in which all parts are by weight.

*Example I*

Two hundred and seventeen parts of yellow mercuric oxide, preferably thoroughly moistened, are dissolved in 1000 parts of technical 85% lactic acid mixed with 1000 parts of hot water. When solution is complete, the mass is allowed to cool to room temperature and 94 parts of technical aniline (1.0 mole) are added. After standing at room temperature for four hours, i. e., until a sodium sulfide test shows the absence of inorganic mercuric ion, the mixture is diluted to 4.0 liters with cold water. The resulting solution contains 12% of the lactic acid salt of p-amino-phenylmercuric lactate, equivalent to 5.0% of metallic mercury in organic form.

*Example II*

Two hundred and seventeen parts of yellow mercuric oxide, preferably thoroughly moistened, are dissolved in a mixture of 1050 parts of technical 70% hydroxyacetic acid and 100 parts of hot water. When solution is complete, add 108 parts of technical orthotoluidine and the mixture is allowed to stand at room temperature overnight, or until a sodium sulfide test shows the absence of inorganic mercuric ion. Thereafter, the mixture is diluted to 4.0 liters with water. The resultant solution contains a mixture of the hydroxyacetates of 4-amino, 3-methylphenylmercuric hydroxyacetate and 4,6-bis-(hydroxyacetoxymercuri-), 2-methyl-aniline, equivalent to 5.0% of organically bound mercury.

The sodium sulfide test referred to above is effected by adding a 5% aqueous $Na_2S$ solution to an equal volume of the solution being tested. Inorganic mercuric ion gives a black precipitate of mercuric sulfide; the aminoarylmercuric ions of the compounds of the present invention give white to gray precipitates, which turn black very slowly.

*Example III*

This example illustrates the preparation of a fungicidal composition and its use in the mildew-proofing of fabrics.

One part of the solution of organic mercuric compounds, as obtained by the process of Example II, is mixed with 99 parts of starch solution, such as that used for the sizing of clothes. Cotton fabric in continuous length is passed through this fungicidal composition and is then wrung free of sufficient excess solution, so that the fabric retains an equal weight of solution, i. e., 100% pickup. Thereafter, the fabric is dried in usual fashion.

The resulting treated material is found to be bacteristatic, fungistatic and relatively completely resistant to rot and mildew, even under most humid and adverse conditions. Further, the resulting cloth is found to retain these germicidal properties, even after repeated laundering.

Example IV

This example illustrates the use of the compounds of this invention in the control of slime in paper mills.

One ounce of the solution prepared in accordance with Example I is added to the beater of a paper mill for about every one-half to one ton of pulp solids, the exact dosage being variable and depending primarily upon the extent of fungal infection in the paper mill system and the condition of the white water supply. Thus, for a heavily infected system, dosages of 4 ounces of the solution per ton of pulp solids for 3 or 4 days, followed by a gradual diminution to one-half ounce of solution per ton will be found satisfactory. This addition of this water soluble organic mercury compound is found to control and substantially completely eliminate fungal infection from the paper mill water system.

The free amines of the salts described in the above examples, or elsewhere in this specification, may be readily prepared from the salts by treatment of the salt with one mol of alkali for each mol of the amine salt.

The compounds of the present invention, while they are substantive to ligno-cellulosic materials, are also ideally suited for imparting bactericidal and fugicidal properties to non-ligno-cellulosic materials, such as wool, rayon, nylon, leather, rubber, paints, and other protective coating, cosmetics, oils, waxes, plastics and plastic articles, etc. They are devoid of any irritating effect on the human skin in the concentrations at which they are used. They may be applied by dipping, spraying, dusting, mixing or any other convenient means.

In preparing minor organism destructive products from my aminoaryl mercuric compounds, it is advantageous to incorporate surface active agents which are non-reactive with the mercury compounds in the compositions. Wetting agents of the non-ionic type are preferable, for example, alkyl polyethylene ethers, fatty acid esters of polybasic alcohols, e. g., sorbitol monolaurate; polyalkylene ether alcohols; polyalkylene glycol esters; and similar products.

The compositions of this invention are particularly useful as substantive fungicidal and bactericidal agents for seeds, sprouts, plants, flowers, bushes, shrubs, fruits, trees and other growing or dormant phytobiologicals. When the compounds therein contact the seeds or the like, they form a substantive bond with the ligno-cellulosic hard, outer seed coat (testa or integument) and are, therefore, ideally suited for the prevention of fungus infestation seed decay, seedling damping-off and other types of microbian attack. When used in concentration of between 0.10% and 0.000001%, these compounds effectively inhibit and destroy all toxic forms of microbian life. These compositions are also useful as herbicides for the control of such weeds as crab-grass, dandelions, etc. My compounds in dilute aqueous solution, e. g., a solution of about 1 part in 10,000 parts of water, are also useful for the effective and inexpensive control of sap-stain on lumber.

The term "microorganism destructive," as employed in the discussion above and in the appended claims, is used as a generic term to include the more specific terms, herbicidal, and germicidal and the still more specific terms fungicidal and bactericidal, and it should be observed that, in general, the products of this invention possess all of these properties, while, at the same time, they are relatively less toxic to human beings and domestic animals.

I claim:

1. An organic mercury compound from the group consisting of the free base form and monocarboxylic aliphatic acid salts of aminoaryl compounds of the general formula:

wherein $n$ is an integer from the group consisting of 1 and 2, R is a radical from the group consisting of hydrogen and alkyl, and A is an aryl radical.

2. An organic mercury compound of the general formula:

wherein $n$ is an integer from the group consisting of 1 and 2, R is an alkyl radical and A is an aryl radical.

3. An organic mercury compound of the general formula:

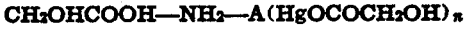

wherein $n$ is an integer from the group consisting of 1 and 2 and A is an aryl radical.

4. As a new product, an alpha-monohydroxy-acyloxymercuriphenyl ammonium alpha-monohydroxy aliphatic monocarboxylate of the general formula:

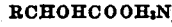
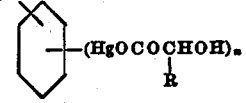

wherein R is a radical from the group consisting of hydrogen and hydrocarbon and $n$ is an integer from the group consisting of 1 and 2.

5. As a new product, hydroxyacetoxymercuriphenyl ammonium hydroxyacetate of the formula:

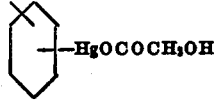

6. As a new product, lactoxymercuriphenyl ammonium lactate of the formula:

7. As a new product, an aminophenylmercuric aliphatic alphamonohydroxymonocarboxylate of the general formula:

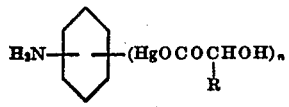

wherein R is a radical from the group consisting of hydrogen and hydrocarbon and $n$ is an integer from the group consisting of 1 and 2.

8. As a new product, an aminophenylmercuric hydroxyacetate of the formula:

9. A germicidal composition comprising an aqueous solution of a surface active agent and a compound of claim 1.

10. Germicidal cellulosic material comprising cellulosic material containing an organic mercury compound from the group consisting of the free base form and monocarboxylic aliphatic acid salts of aminoaryl compounds of the general formula:

$$H_2N-A(HgOCOCHOHR)_n$$

wherein $n$ is an integer from the group consisting of 1 and 2, R is a radical from the group consisting of hydrogen and alkyl, and A is an aryl radical.

JONAS KAMLET.

REFERENCES CITED

The following references are of record in the file of this patent:

UNITED STATES PATENTS

| Number | Name | Date |
|---|---|---|
| 1,787,630 | Kharasch | Jan. 6, 1931 |
| 2,157,009 | Perkins | May 2, 1939 |
| 2,353,312 | Kobe et al. | July 11, 1944 |
| 2,423,044 | Nowak | June 24, 1947 |